US012217731B2

(12) United States Patent
Park et al.

(10) Patent No.: US 12,217,731 B2
(45) Date of Patent: Feb. 4, 2025

(54) SOUND INSULATION PANEL AND SOUND INSULATION STRUCTURE COMPRISING THE SAME

(71) Applicant: JJNS CO., LTD., Daejeon (KR)

(72) Inventors: Jong Jin Park, Sejong-si (KR); Jun Hyuk Kwak, Sejong-si (KR); Hyun June Jung, Daejeon (KR)

(73) Assignee: JJNS CO., LTD., Daejeon (KR)

( * ) Notice: Subject to any disclaimer, the term of this patent is extended or adjusted under 35 U.S.C. 154(b) by 295 days.

(21) Appl. No.: 17/844,768

(22) Filed: Jun. 21, 2022

(65) Prior Publication Data

US 2023/0360624 A1 Nov. 9, 2023

(30) Foreign Application Priority Data

May 3, 2022 (KR) ........................ 10-2022-0055079

(51) Int. Cl.

| | |
|---|---|
| ***G10K 11/162*** | (2006.01) |
| ***E04B 1/84*** | (2006.01) |
| ***E04B 1/86*** | (2006.01) |
| ***G10K 11/172*** | (2006.01) |

(52) U.S. Cl.

CPC .............. *G10K 11/162* (2013.01); *E04B 1/86* (2013.01); *G10K 11/172* (2013.01); *E04B 2001/8414* (2013.01); *E04B 2001/849* (2013.01)

(58) Field of Classification Search

CPC ...... G10K 11/162; G10K 11/172; E04B 1/86; E04B 2001/8414; E04B 2001/849

See application file for complete search history.

(56) References Cited

U.S. PATENT DOCUMENTS

| | | | | |
|---|---|---|---|---|
| 10,704,255 | B2 * | 7/2020 | Hakuta | E04B 1/8409 |
| 11,893,971 | B2 * | 2/2024 | Park | G10K 11/168 |
| 2013/0087407 | A1 * | 4/2013 | McKnight | G10K 11/172 181/287 |
| 2019/0295522 | A1 * | 9/2019 | Hakuta | G10K 11/16 |
| 2020/0223375 | A1 * | 7/2020 | Hakuta | B60R 13/0884 |

FOREIGN PATENT DOCUMENTS

| | | | |
|---|---|---|---|
| JP | 10-245823 | A | 9/1998 |
| JP | 10-331117 | A | 12/1998 |
| JP | 2021-146876 | A | 9/2021 |
| KR | 10-1735262 | B1 | 5/2017 |
| KR | 10-2238144 | B1 | 4/2021 |

* cited by examiner

*Primary Examiner* — Forrest M Phillips

(74) *Attorney, Agent, or Firm* — Revolution IP, PLLC

(57) ABSTRACT

Disclosed herein is a sound insulation panel which is easy to manufacture and has a light weight. The sound insulation panel includes: a patterned plate comprising an edge plate and a separation plate extending into an inner region of the edge plate and dividing the inner region into a first elastic region and a second elastic region; and an elastic plate protruding from the patterned plate to be stepped with respect to the patterned plate and including a first elastic plate disposed in the first elastic region and a second elastic plate disposed in the second elastic region, the elastic plate blocking an air flow path and converting airborne sound waves into elastic waves, wherein the first elastic plate and the second elastic plate are displaced in opposite directions at a resonant frequency of the sound insulation panel.

11 Claims, 12 Drawing Sheets

(a)

(b)

(a)

(b)

SOUND INSULATION PANEL AND SOUND INSULATION STRUCTURE COMPRISING THE SAME

FIELD

The present invention relates to a sound insulation panel and a sound insulation structure including the same and, more particularly, to a sound insulation panel which is easy to manufacture and has a light weight, and a sound insulation structure including the same.

BACKGROUND

Sound insulators prevent transmission of sound waves by completely reflecting energy of the sound waves and are thus used in fields that require soundproofing.

In general, plate-like materials having good noise blocking properties, such as sheet steel, plastic plywood, drywall, and synthetic rubber, are attached to a structure to control transmission of sound waves through the structure and to reduce noise carried through the structure.

Such sound insulators are used for soundproofing between floors or rooms or soundproofing for machine rooms or air-conditioning rooms, as well as a material for noise barrier walls. In addition, the sound insulators are used in special purpose rooms requiring 100% blocking of outside noise, such as broadcasting studios, recording rooms, and instrument practice rooms, in order to block noise at various frequencies.

However, sound insulators obey the acoustic mass law, which is a law of physics which states that a transmission loss of sound through a barrier (sound insulator) depends on the product of the areal density of the barrier and the frequency of sound. According to this law, sound insulation increases with increasing weight (density) of the barrier or with increasing frequency of sound.

Typical sound insulators, such as sheet steel, synthetic rubber, and drywall, have the drawback of heavy weight due to high density of raw materials thereof.

In particular, a sound insulator needs to be increased in thickness to block low frequency noise, which leads to increase in weight of the sound insulator and thus difficulty in providing weight reduction.

RELATED LITERATURE

Patent Document

Korean Patent Registration No. 10-1735262 (registration date: 2017.05.06)

SUMMARY

Embodiments of the present invention are conceived to solve such a problem in the art and it is an object of the present invention to provide a sound insulation panel which is easy to manufacture and has a light weight, and a sound insulation structure including the same.

It will be understood that objects of the present invention are not limited to the above. The above and other objects of the present invention will become apparent to those skilled in the art from the detailed description of the following embodiments in conjunction with the accompanying drawings.

In accordance with one aspect of the present invention, there is provided a sound insulation panel including: a patterned plate including an edge plate and a separation plate extending into an inner region of the edge plate and dividing the inner region into a first elastic region and a second elastic region; and an elastic plate protruding from the patterned plate to be stepped with respect to the patterned plate and including a first elastic plate disposed in the first elastic region and a second elastic plate disposed in the second elastic region, the elastic plate blocking an air flow path and converting airborne sound waves into elastic waves, wherein the first elastic plate and the second elastic plate are displaced in opposite directions at a resonant frequency of the sound insulation panel.

In one embodiment, the first elastic plate and the second elastic plate may be flush with each other.

In one embodiment, the patterned plate may further include a protruding plate protruding from the edge plate or the separation plate and having one end connected to the edge plate or the separation plate and the other end having the first elastic plate and the second elastic plate disposed thereon.

In one embodiment, the protruding plate may be corrugated to be variable in height.

In one embodiment, the sound insulation panel may further include: an extension portion formed on a pair of protruding plates facing each other, wherein the extension portion may have a second width greater than a first width of the separation plate.

In one embodiment, the first elastic region may include a center of the inner region of the edge plate and the second elastic region may include multiple second elastic regions arranged around the first elastic region.

In one embodiment, the first elastic region and the second elastic region may be formed in pairs symmetric with respect to imaginary perpendicular lines or diagonal lines passing through the center of the inner region.

In one embodiment, the first elastic region and the second elastic region may have the same shape and area.

In one embodiment, the first elastic region and the second elastic region may be alternately arranged at an equal angular interval about the center of the inner region.

In one embodiment, the patterned plate may further include a central plate formed at the center of the inner region through intersection between multiple sections of the separation plate.

In one embodiment, the sound insulation panel may further include: a protruding pattern portion protruding from the central plate, wherein the protruding pattern portion may be connected at one thereof to the central plate and may be closed at the other end thereof.

In one embodiment, the protruding pattern portion may be corrugated to be variable in height.

In one embodiment, the patterned plate and the elastic plate may be formed of a polymer.

In one embodiment, the patterned plate and the elastic plate may be integrally formed with each other.

In accordance with another aspect of the present invention, there is provided a sound insulation structure including the sound insulation panel set forth above, wherein the sound insulation panel includes multiple sound insulation panels arranged in an air flow direction and the multiple sound insulation panels include different sizes of elastic plates to have different resonant frequencies to block noise at different frequencies, respectively.

In accordance with a further aspect of the present invention, there is provided a sound insulation structure including the sound insulation panel set forth above, wherein the sound insulation panel includes multiple sound insulation panels arranged in a direction crossing an air flow direction and the multiple sound insulation panels include different sizes of elastic plates to have different resonant frequencies to block noise at different target frequencies, respectively.

The sound insulation panel according to the embodiments of the present invention is easy to manufacture and has a light weight since the patterned plate and the elastic plate are formed of a polymer and are integrally molded in the form of a panel by vacuum molding, press molding, or the like.

In addition, according to the embodiments of the present invention, the resonant frequency of the sound insulation panel can be effectively regulated through adjustment of the area of the elastic plate or the height of the protruding plate, thereby ensuring easy and effective mode conversion and resonant frequency tuning of the sound insulation structure.

It will be understood that advantageous effects of the present invention are not limited to the above and include any advantageous effects conceivable from the features disclosed in the detailed description of the invention or the appended claims.

DRAWINGS

The above and other aspects, features, and advantages of the present invention will become apparent from the detailed description of the following embodiments in conjunction with the accompanying drawings.

DETAILED DESCRIPTION

Figure 1:
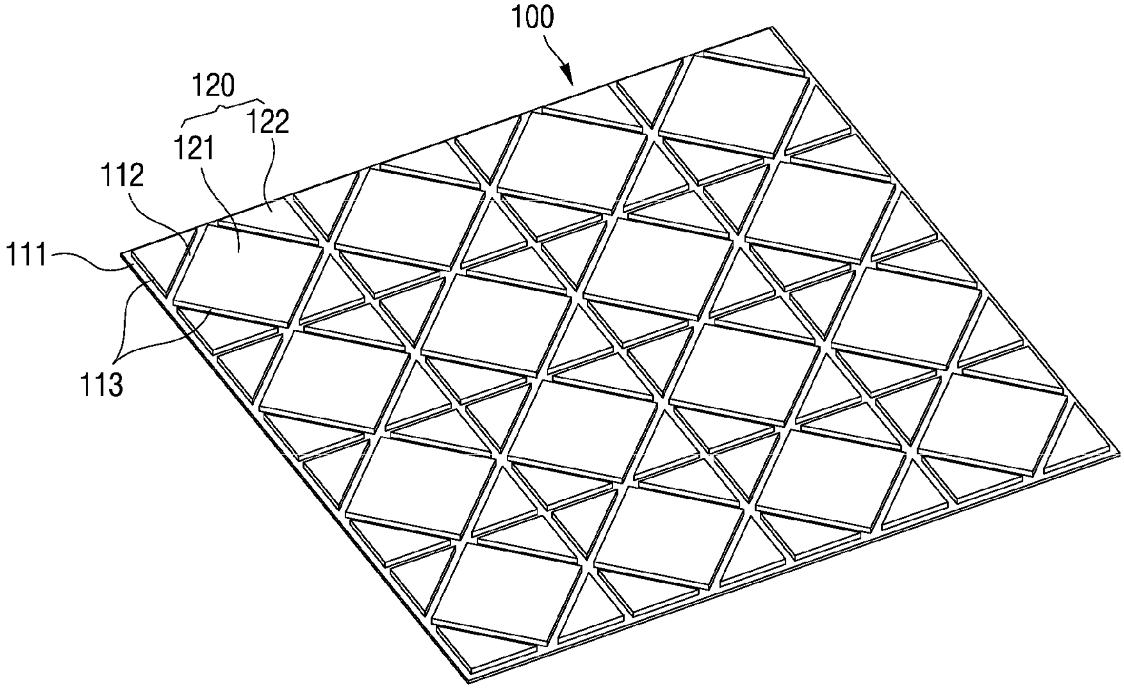
FIG. 1 is a perspective view of a sound insulation panel according to a first embodiment of the present invention.

Hereinafter, embodiments of the present invention will be described with reference to the accompanying drawings. It should be understood that the present invention may be embodied in different ways and is not limited to the following embodiments. In the drawings, portions irrelevant to the description will be omitted for clarity. Like components will be denoted by like reference numerals throughout the specification.

Throughout the specification, when an element or layer is referred to as being "connected to (or on)" another element or layer, it may be directly connected to (or on) the other element or layer, or may be indirectly connected to (or on) the other element with a different element interposed therebetween. In addition, unless stated otherwise, the term "includes" should be interpreted as not excluding the presence of other components than those listed herein.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Figure 2:
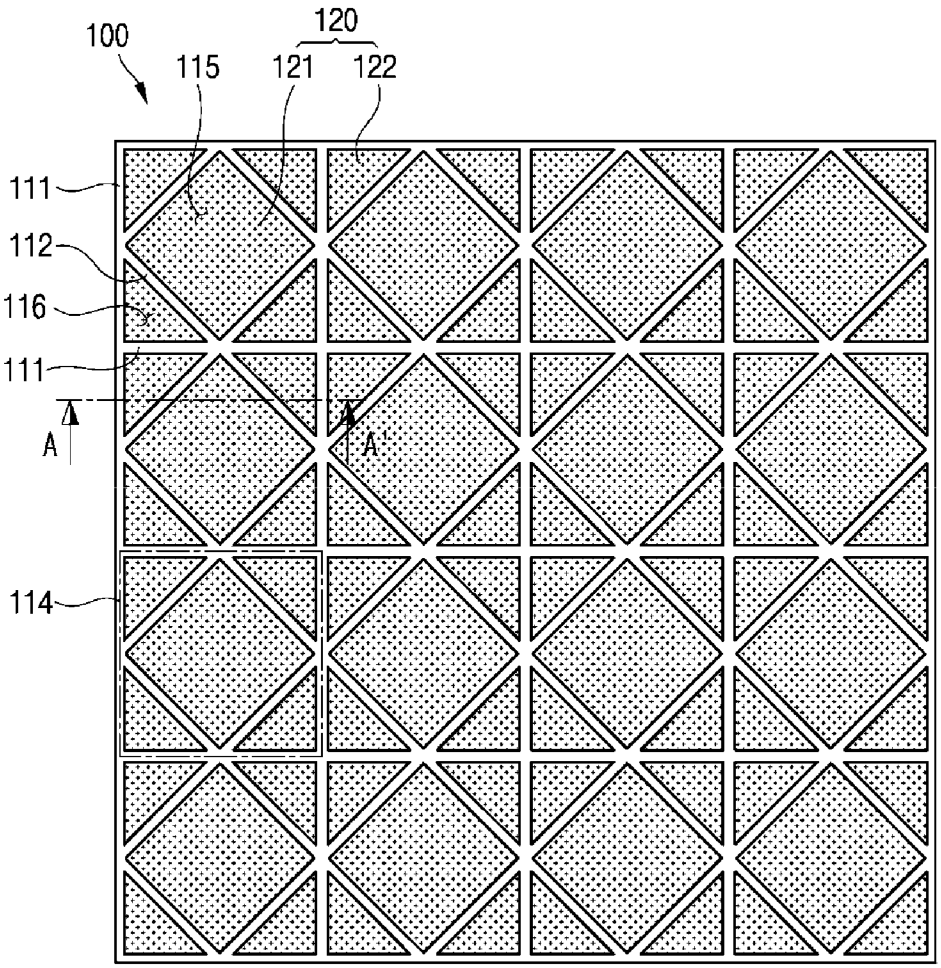
FIG. 2 is a plan view of FIG. 1.
Figure 3:
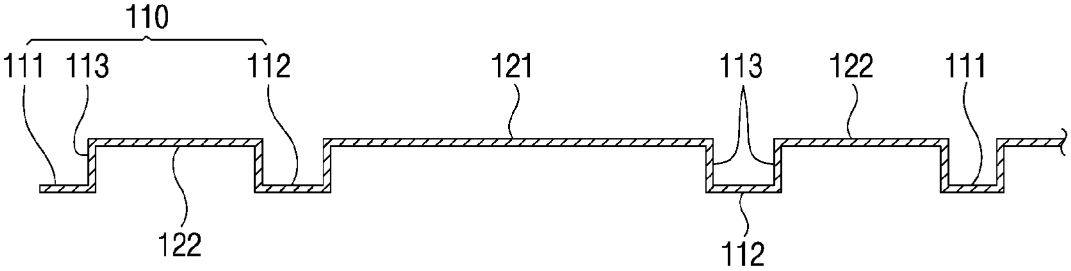
FIG. 3 is a sectional view taken along line A-A' of FIG. 2.
Figure 4:
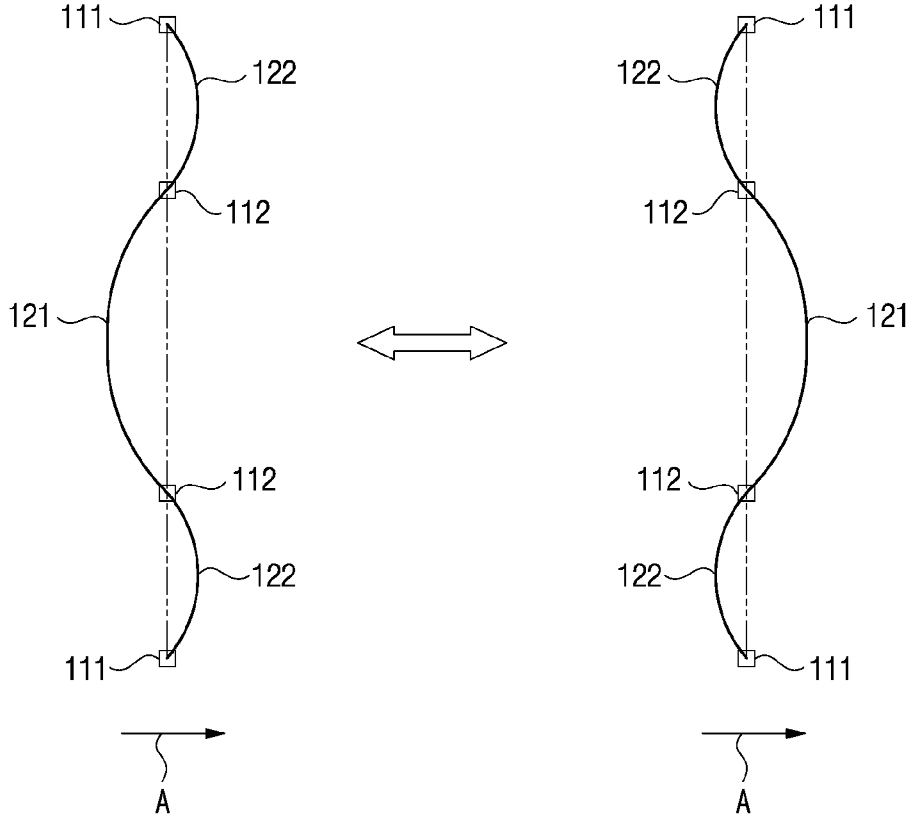
FIG. 4 is a schematic view illustrating the operational principle of the sound insulation panel according to the first embodiment.

FIG. 1 is a perspective view of a sound insulation panel according to a first embodiment of the present invention, FIG. 2 is a plan view of FIG. 1, FIG. 3 is a sectional view taken along line A-A' of FIG. 2, and FIG. 4 is a schematic view illustrating the principle of the sound insulation panel according to the first embodiment.

Referring to FIG. 1 to FIG. 4, the sound insulation panel 100 may include a patterned plate 110 and an elastic plate 120.

The patterned plate 110 may include an edge plate 111, a separation plate 112, and a protruding plate 113.

The edge plate 111 may extend in horizontal and vertical directions to define multiple cells 114. The edge plate 111 may form an edge of each cell 114. Here, the cell 114 may be the smallest functional unit of the sound insulation panel.

The separation plate 112 may extend into an inner region of the edge plate 111 to divide the inner region of the edge plate 111. Specifically, the separation plate 112 may divide the inner region of the edge plate 111 into a first elastic region 115 and a second elastic region 116. The edge plate 111 and the separation plate 112 may be on the same plane.

The edge plate 111 may extend in the horizontal and vertical directions to define a lattice structure consisting of multiple cells 114. The edge plate 111 and the separation plate 112 may be connected to each other.

In this embodiment, the separation plate 112 may be formed in a rhombic shape inside the edge plate 111.

The first elastic region 115 may include a center of an inner region of the cell 114. The first elastic region 115 may have a square shape.

The second elastic region 116 may be separated from the first elastic region 115. The second elastic region 116 may include multiple second elastic regions 116 disposed around the first elastic region 115. Specifically, the multiple second elastic regions 116 may have a triangular shape to correspond to sides of the first elastic region 115, respectively.

The first elastic region 115 and the second elastic region 116 may be open in an air flow direction.

The protruding plate 113 may protrude from the edge plate 111 or the separation plate 112 with one end thereof connected to the edge plate 111 or the separation plate 112.

The elastic plate 120 may include a first elastic plate 121 and a second elastic plate 122.

The first elastic plate 121 and the second elastic plate 122 may be disposed at the other end of the protruding plate 113.

In this embodiment, the protruding plate 113 may be formed perpendicular to the edge plate 111 and the separation plate 112. Accordingly, the first elastic plate 121 may have substantially the same shape and area as the first elastic region 115. In addition, the second elastic plate 122 may have substantially the same shape and area as the second elastic region 116.

The first elastic plate 121 and the second elastic plate 122 may have a different height than the edge plate 111 and the separation plate 112, that is, may be stepped with respect to the edge plate 111 and the separation plate 112.

In addition, the first elastic plate 121 and the second elastic plate 122 may be flush with each other.

In each cell 114, the sum of areas of portions of the patterned plate 110 having a plane perpendicular to the air flow direction may be smaller than the sum of areas of portions of the elastic plate 120 having a plane perpendicular to the air flow direction. In other words, the sum of areas of the edge plate 111 and the separation plate 112 may be smaller than the sum of areas of the first elastic plate 121 and the second elastic plate 122. More preferably, the edge plate 111 and the separation plate 112 have a smaller width than the first elastic plate 121 and the second elastic plate 122.

Since the edge plate 111 and the separation plate 112 are relatively narrow and the first elastic plate 121 the second elastic plate 122 are relatively wide, there may be a difference in stiffness therebetween. Accordingly, the edge plate 111 and the separation plate 112, which are relatively narrow, may function as a frame, and the first elastic plate 121 and the second elastic plate 122, which are relatively wide, may function as a membrane. That is, the first elastic plate 121 and the second elastic plate 122 may function as a membrane blocking an air flow path and converting airborne sound waves into elastic waves.

Referring to FIG. 4, the first elastic plate 121 and the second elastic plate 122 may be displaced in opposite directions at a resonant frequency of the sound insulation panel 100. Here, the sound insulation panel 100 is designed to have a resonant frequency identical to a frequency of noise desired to be blocked.

For example, at one moment in time, the second elastic plate 122 may be displaced in the air flow direction A and the first elastic plate 121 may be displaced in an opposite direction with respect to the air flow direction A upon receiving sound waves having a frequency falling within the resonant frequency band of the sound insulation panel 100. Then, at another moment in time, the second elastic plate 122 may be displaced in the opposite direction with respect to the air flow direction A and the first elastic plate 121 may be displaced in the air flow direction A.

As such, a resonance mode is repeated in which, when the first elastic plate 121 has a positive displacement with respect to the air flow direction A, the second elastic plate 122 has a negative displacement with respect to the air flow direction A and, when the first elastic plate 121 has a negative displacement with respect to the air flow direction A, the second elastic plate 122 has a positive displacement with respect to the air flow direction A.

Since displacement of the first elastic plate 121 and displacement of the second elastic plate 122 occur in opposite directions, an effective displacement of the elastic plate 120 approaches zero, wherein the effective displacement represents the average of local displacements of the elastic plate 120.

When the effective displacement of the elastic membrane 120 has a value of zero, a phenomenon occurs in which almost no airborne sound energy is transmitted through the elastic plate 120, whereby noise in a target frequency band can be blocked without being transmitted downstream of the elastic plate 120.

The phenomenon that the effective displacement of the elastic plate 120 approaches zero is expressed as an effective density of air being maximized. When the effective density of air is maximized, sound waves will react as if the sound insulation panel 100 is a very heavy wall and thus will be reflected upon arriving at the sound insulation panel 100, whereby transmission of the sound waves can be blocked.

Here, it is desirable that the area of the first elastic region 115, that is, the area of the first elastic plate 121, be substantially the same as the sum of areas of the multiple second elastic regions 116, that is, the sum of areas of the multiple second elastic plates 122 since a region of the elastic plate 120 having a positive displacement needs to have substantially the same area as a region of the elastic plate 120 having a negative displacement in order to ensure that the effective displacement of the elastic plate 120 is zero.

The resonant frequency of the sound insulation panel 100 may be adjusted by changing the area of the patterned plate 110, the area of the elastic plate 120, and the like. In addition, the size of the patterned plate 110 may be adjusted depending on the frequency band of noise desired to be blocked.

The sound insulation panel 100 may be formed of a polymer material, and may be manufactured in a single piece by molding a polymer film by vacuum molding, press molding, or the like.

Figure 5:
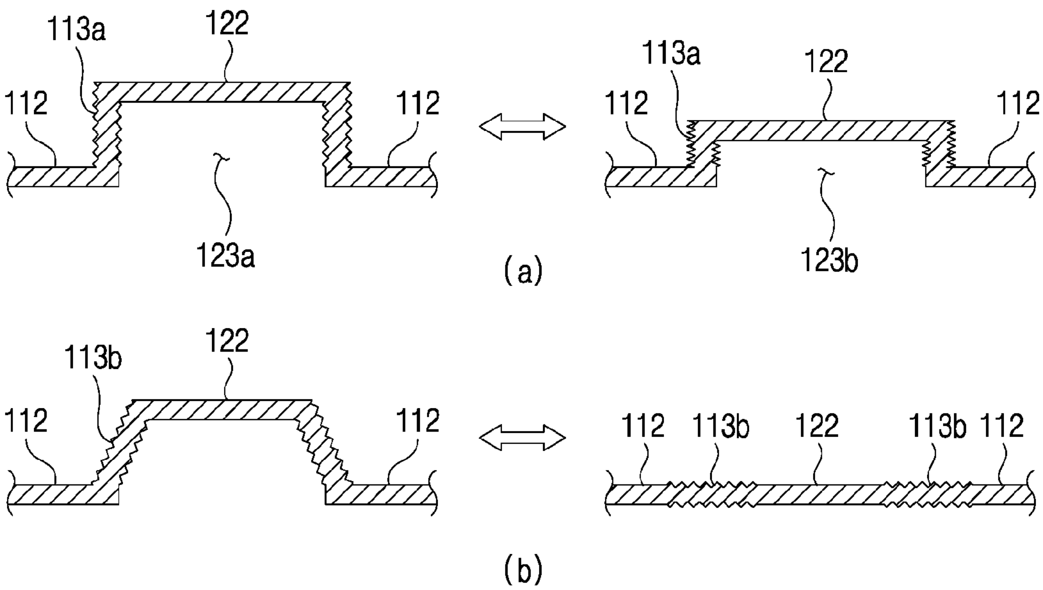
FIG. 5 shows exemplary sectional views of the sound insulation panel according to the first embodiment.

FIG. 5 shows exemplary sectional views of the sound insulation panel according to the first embodiment. Referring to FIG. 5(*a*), the protruding plate 113*a* may be corrugated. Accordingly, the protruding plate 113*a* may be variable in height.

Since the protruding plate 113*a* is corrugated, the volume of a space 123*a* defined by the second elastic plate 122 and the protruding plate 113*a* is increased when the protruding plate 113*a* is unfolded. As a result, the mass of air received in the space 123*a* increases, thus causing reduction in fundamental resonance frequency of the sound insulation panel 100.

Conversely, when the protruding plate 113*a* is folded, the volume of the space 123*b* defined by the second elastic plate 122 and the protruding plate 113*a* is reduced. As a result, the mass of air received in the space 123*b* decreases, thus causing increase in fundamental resonance frequency of the sound insulation panel 100.

As will be described below, a sound insulation structure includes multiple sound insulation panels. Here, when the height of the protruding plate 113*a* is tuned differently for each sound insulation panel, diffuse reflection capability of the sound insulation structure can be improved. This results in improvement in soundproofing effects as well as sound insulation effects, making it possible to apply the sound insulation structure to various structures, including walls.

In addition, since the thickness of the sound insulation panel can be reduced by folding the protruding plate 113*a*, loading of the sound insulation panel can be facilitated during a production process thereof or the volume for transportation can be reduced, thereby improving transportation convenience.

Referring to FIG. 5(*b*), the protruding plate 113*b* may obliquely protrude from the separation plate 112. In this way, when the protruding plate 113*b* is folded, the second elastic plate 122 can be coplanar with the separation plate 112 and thus the thickness of the sound insulation panel can be further reduced.

Although the description has been given using a protruding plate having the second elastic plate 122 as an example, it should be understood that the present invention is not limited thereto and the same may be applied to a protruding plate having the first elastic plate 121.

Figure 6:
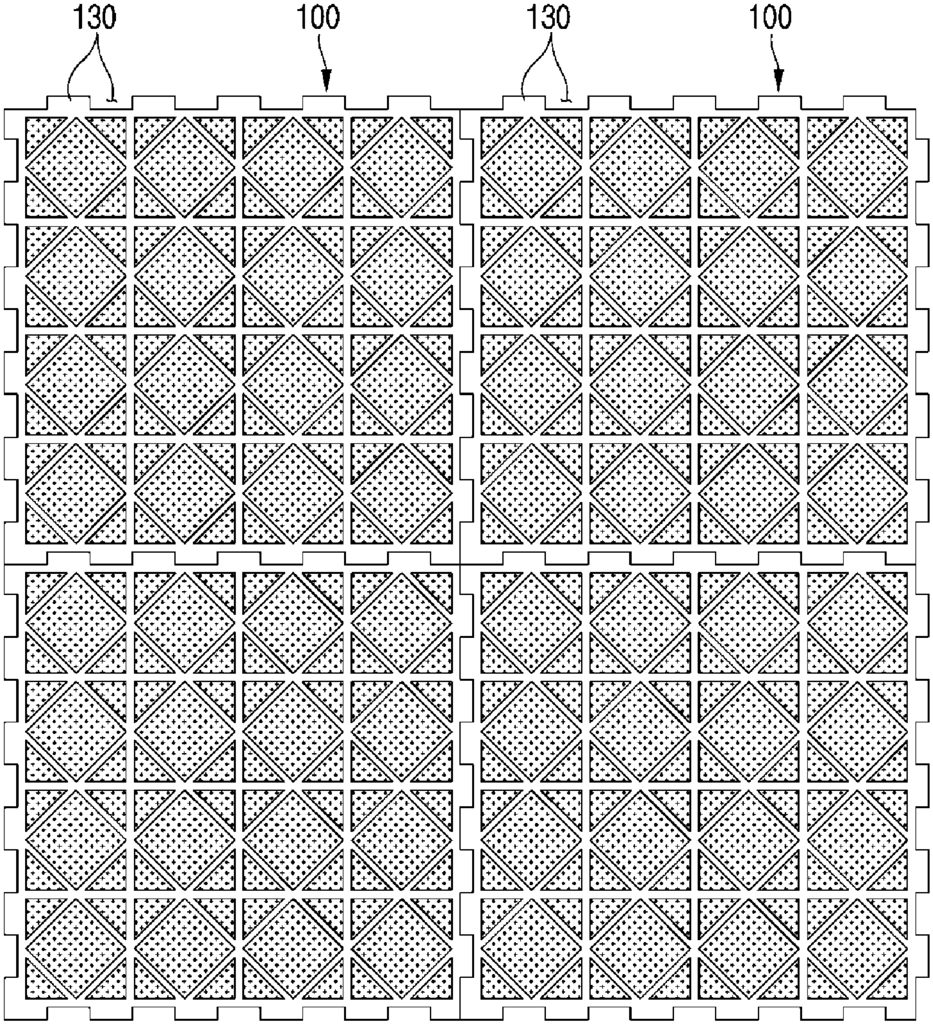
FIG. 6 is an exemplary view of the sound insulation panel according to the first embodiment, illustrating raised and recessed portions formed on the sound insulation panel.

FIG. 6 is an exemplary view of the sound insulation panel according to the first embodiment, illustrating raised and recessed portions formed on the sound insulation panel.

Referring to FIG. 6, the sound insulation panel 100 may further include multiple raised and recessed portions formed along an edge thereof. Accordingly, neighboring sound insulation panels 100 may be coupled to one another via the raised and recessed portions. That is, the raised and recessed portions 130 facilitate coupling between many sound insulation panels 100, thereby allowing fabrication of a large area sound insulation structure.

Figure 7:
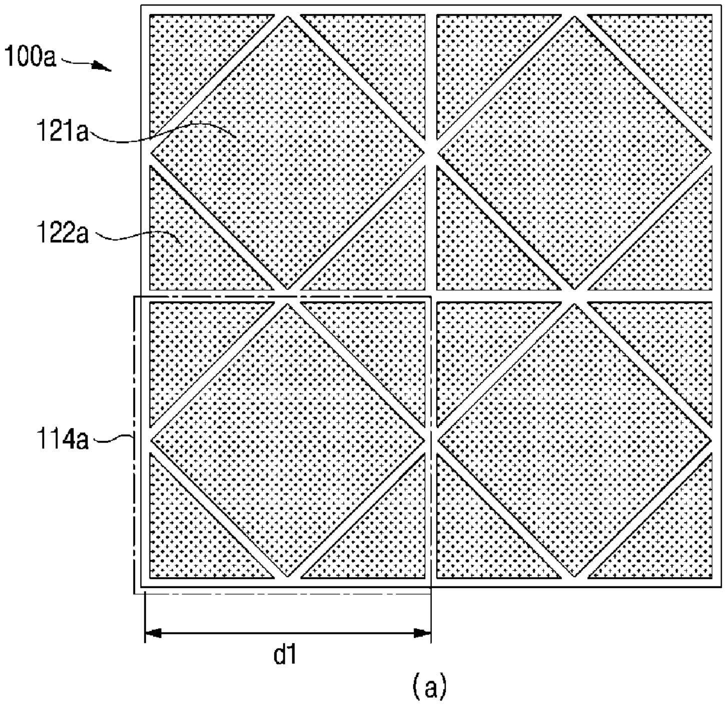
FIG. 7 is a view illustrating different cell sizes of the sound insulation panel according to the first embodiment.
Figure 7:
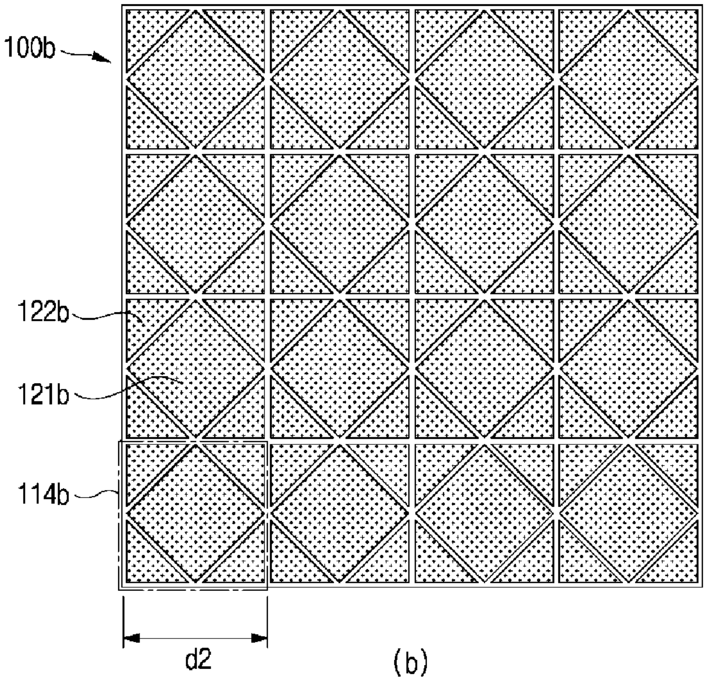

FIG. 7 is a view illustrating different cell sizes of the sound insulation panel according to the first embodiment.

Referring to FIG. 7(*a*), when frequencies of noise desired to be blocked are relatively low, each side of the cell 114*a* may have a relatively long length d1, increasing the size of the cell 114*a*. Conversely, referring to FIG. 7(*b*), when frequencies of noise desired to be blocked are relatively high, each side of the cell 114*b* may have a relatively short length d2, reducing the size of the cell 114*b*.

Here, it is desirable that the size of the first elastic plate 121*a*; 121*b* and the size of the second elastic plate 122*a*; 122*b* be varied in proportion to the size of the cell 114*a*; 114*b*.

Figure 8:
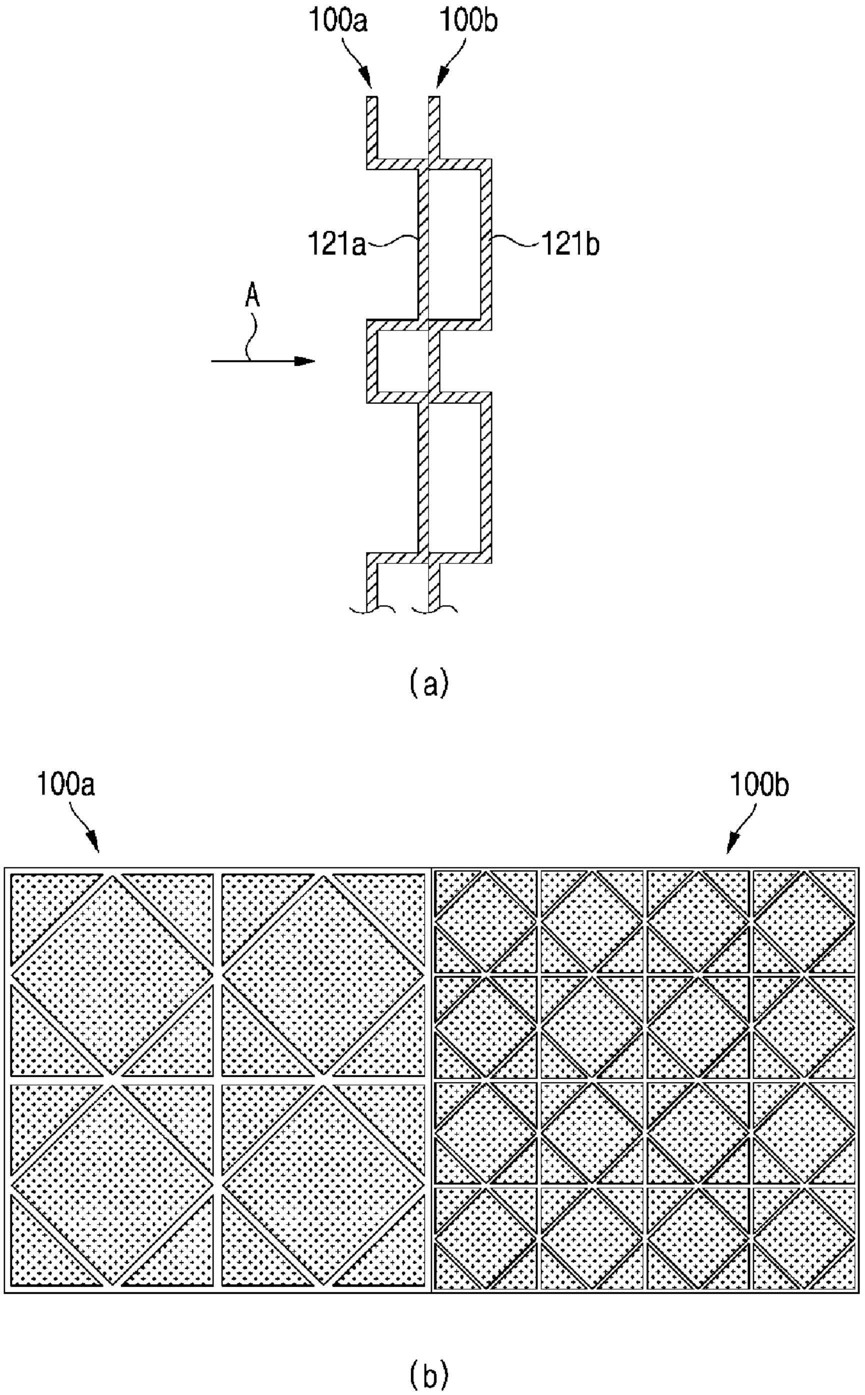
FIG. 8 is an exemplary view of a sound insulation structure according to a first embodiment of the present invention.

FIG. 8 is an exemplary view of a sound insulation structure according to a first embodiment of the present invention.

Referring to FIG. 8(*a*), the sound insulation structure according to this embodiment includes multiple sound insulation panels 100*a*, 100*b*, wherein the sound insulation panels 100*a*, 100*b* may be arranged in the air flow direction A. That is, the sound insulation panels 100*a*, 100*b* may be arranged in a layered manner in the air flow direction A.

Although the sound insulation panel 100*a* may have the same cell size as the sound insulation panel 100*b*, it should be understood that the present invention is not limited thereto. That is, each of the sound insulation panels 100*a*, 100*b* may have a different cell size. In this way, each of the sound insulation panels 100*a*, 100*b* can have a different resonant frequency and thus can block noise in a different frequency band.

In addition, referring to FIG. 8(*b*), a sound insulation structure according to another embodiment may include multiple sound insulation panels 100*a*, 100*b*, wherein the sound insulation panels 100*a*, 100*b* may be arranged in a direction crossing the air flow direction A.

In addition, each of the sound insulation panels 100*a*, 100 *b* may have a different cell size. In this way, each of the sound insulation panels 100*a*, 100*b* can have a different resonant frequency and thus can block noise in a different frequency band.

In the embodiments shown in FIG. 8(*a*) and FIG. 8(*b*), it is desirable that the size of the first elastic region and the size of the second elastic region be varied in proportion to the cell size.

The sound insulation structure including sound insulation panels having different cell sizes allows broadening of a frequency band of noise desired to be blocked. Accordingly, the sound insulation structure can block noise at various frequencies and thus can provide noise blocking over a broad band of frequencies.

Figure 9:
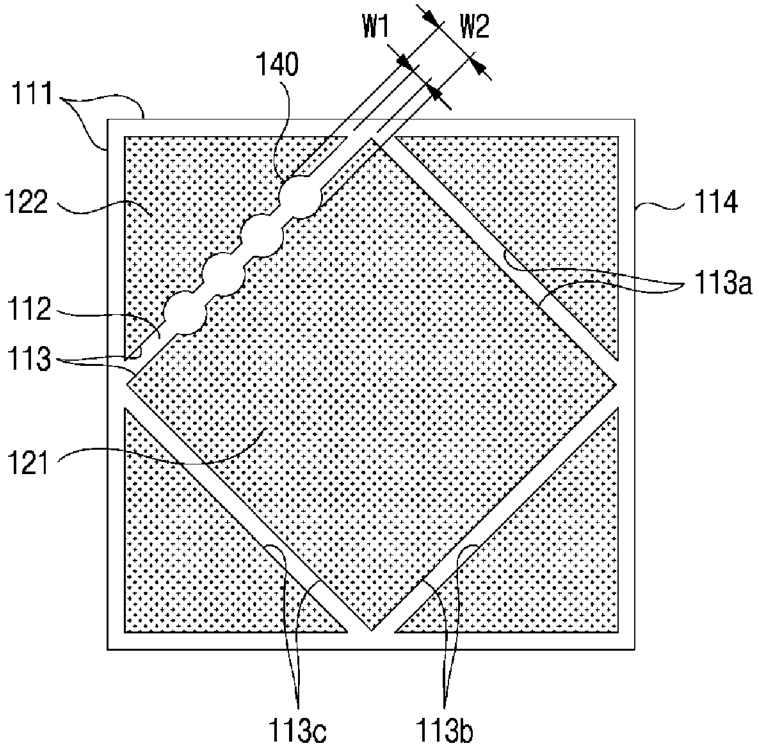
FIG. 9 is an exemplary view illustrating another example of the sound insulation panel according to the first embodiment.

FIG. 9 is an exemplary view illustrating another example of the sound insulation panel according to the first embodiment.

Referring to FIG. 9, the sound insulation panel may further include an extension portion 140.

The extension portion 140 may be formed on a pair of protruding plates 113 facing each other.

The extension portion 140 may have a second width W2 greater than a first width W1 of the separation plate 112. Although the extension portion 140 may have a circular shape, it should be understood that the present invention is not limited thereto and the extension portion 140 may have a polygonal shape. When the extension portion 140 has a circular shape, the second width W2 may be the diameter of the extension portion 140.

The extension portion 140 may be formed at the boundary between the elastic plate 120 and the patterned plate 110 to impart stiffness to the elastic plate 120. Accordingly, it is possible to increase energy loss of airborne sound waves through the first and second elastic plates 121, 122, thereby improving sound insulation capability.

Although the extension portion 140 is shown as being formed on one pair of protruding plates 113 in each cell 114, it should be understood that the present invention is not limited thereto and the extension 140 may also be formed on at least one of the other pairs of protruding plates 113*a*, 113*b*, 113*c*.

Figure 10:
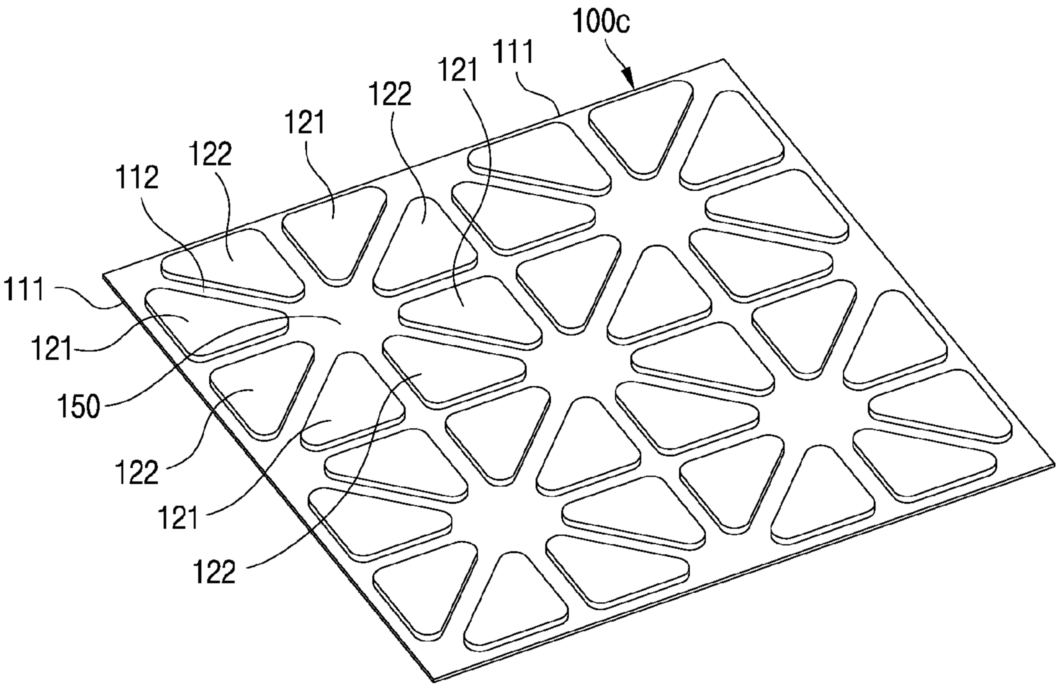
FIG. 10 is a perspective view of a sound insulation panel according to a second embodiment of the present invention.
Figure 11:
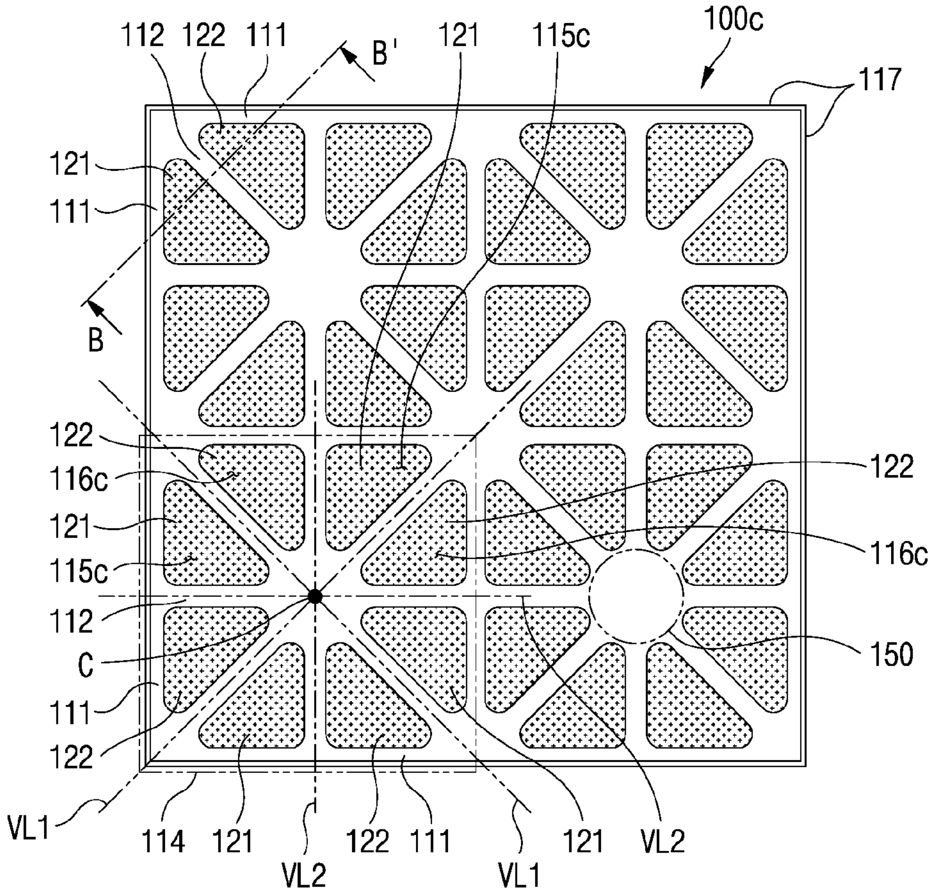
FIG. 11 is a plan view of FIG. 10.
Figure 12:
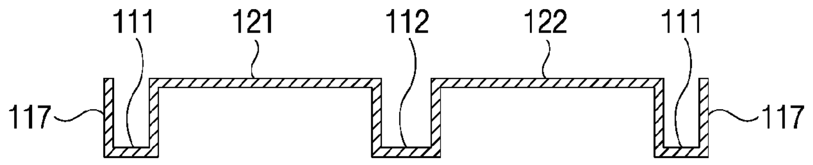
FIG. 12 is a sectional view taken along line B-B' of FIG. 11.

FIG. 10 is a perspective view of a sound insulation panel according to a second embodiment of the present invention, FIG. 11 is a plan view of FIG. 10, and FIG. 12 is a sectional view taken along line B-B' of FIG. 11. The sound insulation panel according to this embodiment is substantially the same as the sound insulation panel according to the first embodiment except that the shape of the elastic plate is different from that in the first embodiment and thus the shape of the patterned plate is different from that in the first embodiment.

Referring to FIG. 10 to FIG. 12, the sound insulation panel according to this embodiment may include a first elastic region 115*c* and a second elastic region 116*c* formed in pairs symmetric with respect to imaginary perpendicular lines or diagonal lines passing through a center C of an inner region of each cell 114.

Specifically, based on the imaginary diagonal lines VL1 passing through the center C of the inner region of each cell 114, the first elastic plate 121 and the second elastic plate 122 may be disposed opposite to each other.

In addition, the first elastic region 115*c* and the second elastic region 116*c* may have the same shape and area, and thus the first elastic plate 121 and the second elastic plate 122 may also have the same shape and area.

In addition, the first elastic region 115*c* and the second elastic region 116*c* may be alternately arranged at an equal angular interval about the center C of the inner region of the cell 114. Accordingly, based on the imaginary perpendicular lines VL2 passing through the center C of the inner region of the cell 114, the first elastic plate 121 and the second elastic plate 122 may also disposed opposite to each other. Thus, when viewed as a whole, each cell has a structure in which the first elastic plate 121 and the second elastic plate 122 are alternately arranged at an equal angular interval about the center C. Here, the imaginary perpendicular lines VL2 may refer to horizontal and vertical lines orthogonal to each other.

In this embodiment, displacement of the first elastic plate 121 and displacement of the second elastic plate 122 may occur in opposite directions, and thus the effective displacement of the elastic plate 120 may approach zero.

In addition, the sound insulation panel according to this embodiment may further include a central plate 150 formed at the center of the inner region of each cell 114. The center plate 150 may be formed by intersection between multiple sections of the separation plate 112.

Figure 13:
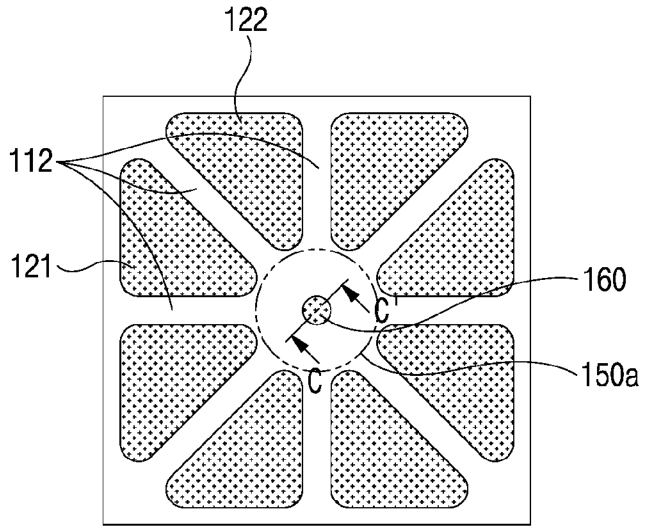
FIG. 13 is a view of another example of the sound insulation panel according to the second embodiment of the present invention.
Figure 13:
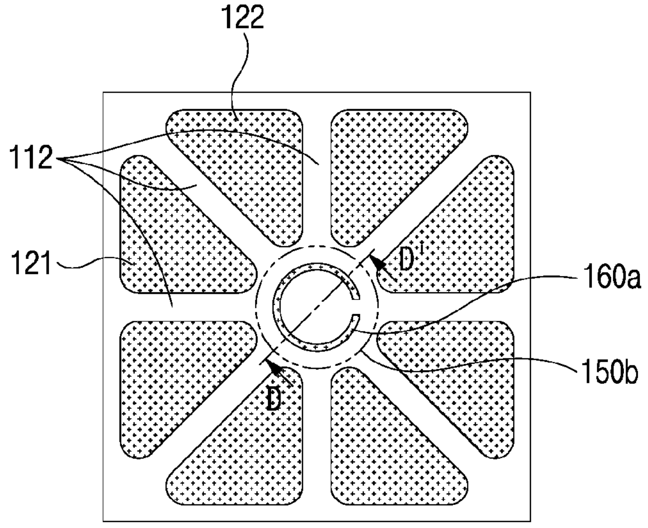
Figure 14:
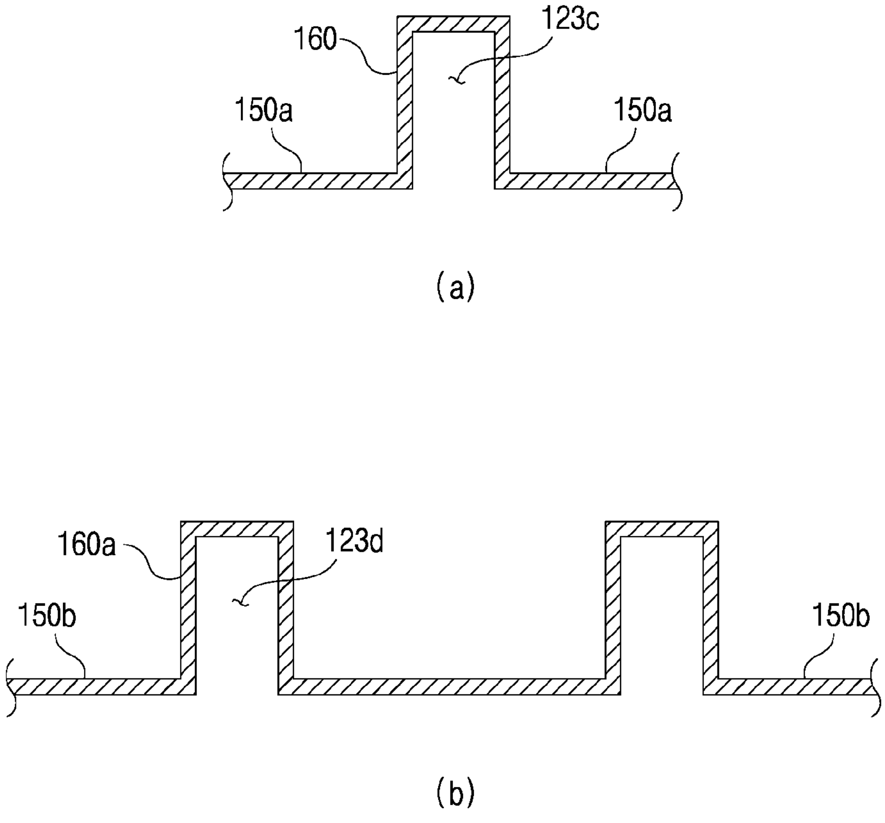
FIG. 14 shows a sectional view taken along line C-C' of FIG. 13 and a sectional view taken along line D-D' of FIG. 13.

FIG. 13 is a view of another example of the sound insulation panel according to the second embodiment, and FIG. 14 show sectional views taken along line C-C' and line D-D' of FIG. 13. Specifically, FIG. 14(*a*) is a sectional view taken along line C-C' of FIG. 13 and FIG. 14(*b*) is a sectional view taken along line D-D' of FIG. 13.

Referring to FIG. 13 and FIG. 14, the sound insulation panel according to this embodiment may further include a protruding pattern portion 160; 160*a*.

The protruding pattern portion 160; 160*a* may protrude from a central plate 150*a*; 150*b*. The protruding pattern portion 160; 160*a* may be connected at one end thereof to the central plate 150*a*; 150*b* and may be closed at the other end thereof.

When a space 123*c*; 123*d* is formed by the protruding pattern portion 160; 160*a*, the mass of air received in the space 123*c*; 123*d* is increased, thus causing reduction in fundamental resonance frequency of the sound insulation panel.

Like the protruding plate, the protruding pattern portion 160; 160*a* may also be corrugated to be variable in height.

The resonant frequency of the sound insulation panel can be effectively regulated through adjustment of the size and shape of the protruding pattern portion 160; 160*a*, thereby ensuring easy and effective mode conversion and resonant frequency tuning of the sound insulation structure. Furthermore, an initial resonant frequency of the sound insulation panel can be set to higher or lower levels through appropriate design of the size of the protruding pattern portion 160; 160*a*.

Although some embodiments have been described herein, it should be understood that that various modifications, changes, alterations, and equivalent embodiments can be made by those skilled in the art without departing from the spirit and scope of the invention. Therefore, it should be understood that these embodiments are provided for illustration only and are not to be construed in any way as limiting the present invention. For example, components described as implemented separately may also be implemented in combined form, and vice versa.

The scope of the present invention is indicated by the following claims and all changes or modifications derived from the meaning and scope of the claims and equivalents thereto should be construed as being within the scope of the present invention.

<List of Reference numerals>

100: Sound insulation panel
110: Patterned plate
111: Edge plate
112: Separation plate
113: Protruding plate
114: Cell
115: First elastic region
116: Second elastic region
120: Elastic plate
121: First elastic plate -continued <List of Reference numerals>

122: Second elastic plate
140: Extension portion
130: Raised and recessed portions
150: Central plate
160, 160a: Protruding pattern portion

The invention claimed is:

1. A sound insulation panel comprising:

a patterned plate comprising an edge plate and a separation plate extending into an inner region of the edge plate and dividing the inner region into a first elastic region and a second elastic region; and an elastic plate protruding from the patterned plate to be stepped with respect to the patterned plate and comprising a first elastic plate disposed in the first elastic region and a second elastic plate disposed in the second elastic region, the elastic plate blocking an air flow path and converting airborne sound waves into elastic waves, wherein the first elastic plate and the second elastic plate are displaced in opposite directions at a resonant frequency of the sound insulation panel, wherein the patterned plate further comprises a protruding plate protruding from the edge plate or the separation plate, having one end connected to the edge plate or the separation plate and another end connected to the first elastic plate or the second elastic plate, and wherein the protruding plate is corrugated to be variable in height.

2. The sound insulation panel according to claim 1, wherein the first elastic plate and the second elastic plate are flush with each other.

3. The sound insulation panel according to claim 1, wherein the patterned plate and the elastic plate are formed of a polymer.

4. The sound insulation panel according to claim 1, wherein the patterned plate and the elastic plate are integrally formed with each other.

5. A sound insulation structure comprising the sound insulation panel according to claim 1, wherein the sound insulation panel comprises multiple sound insulation panels arranged in an air flow direction and the multiple sound insulation panels comprise different sizes of elastic plates to have different resonant frequencies to block noise at different frequencies, respectively.

6. A sound insulation structure comprising the sound insulation panel according to claim 1, wherein the sound insulation panel comprises multiple sound insulation panels arranged in a direction crossing an air flow direction and the multiple sound insulation panels comprise different sizes of elastic plates to have different resonant frequencies to block noise at different target frequencies, respectively.

7. The sound insulation panel according to claim 1, further comprising:

an extension portion formed on a pair of protruding plates facing each other, the extension portion having a second width greater than a first width of the separation plate.

8. The sound insulation panel according to claim 1, wherein the first elastic region comprises a center of the inner region of the edge plate and the second elastic region comprises multiple second elastic regions arranged around the first elastic region.

9. A sound insulation panel comprising:

a patterned plate comprising an edge plate and a separation plate extending into an inner region of the edge plate and dividing the inner region into a first elastic region and a second elastic region, and a central plate formed at the center of the inner region through intersection between multiple sections of the separation plate;

an elastic plate protruding from the patterned plate to be stepped with respect to the patterned plate and comprising a first elastic plate disposed in the first elastic region and a second elastic plate disposed in the second elastic region, the elastic plate blocking an air flow path and converting airborne sound waves into elastic waves;

a protruding pattern portion protruding from the central plate and being corrugated to be variable in height, wherein the first elastic plate and the second elastic plate are displaced in opposite directions at a resonant frequency of the sound insulation panel, wherein the first elastic region and the second elastic region are formed in pairs symmetric with respect to imaginary perpendicular lines or diagonal lines passing through the center of the inner region.

10. The sound insulation panel according to claim 9, wherein the first elastic region and the second elastic region have the same shape and area.

11. The sound insulation panel according to claim 9, wherein the first elastic region and the second elastic region are alternately arranged at an equal angular interval about the center of the inner region.

* * * * *